(12) United States Patent
Chick

(10) Patent No.: US 7,686,541 B2
(45) Date of Patent: Mar. 30, 2010

(54) METHOD OF CONTAINING A SPILL

(75) Inventor: Charles T Chick, Pleasant Hill, MO (US)

(73) Assignee: Ameret, LLC, Lenexa, KS (US)

( * ) Notice: Subject to any disclaimer, the term of this patent is extended or adjusted under 35 U.S.C. 154(b) by 0 days.

(21) Appl. No.: 11/953,483

(22) Filed: Dec. 10, 2007

(65) Prior Publication Data
US 2009/0149690 A1 Jun. 11, 2009

(51) Int. Cl.
*E02B 15/00* (2006.01)
*B01D 15/04* (2006.01)

(52) U.S. Cl. ............... 405/60; 405/52; 405/129.45; 210/690; 210/747

(58) Field of Classification Search ............ 405/52, 405/60, 262, 284, 129.45, 129.6, 129.65; 502/401, 402; 210/693, 690, 691, 747, 170.07, 210/284–286, 290
See application file for complete search history.

(56) References Cited

U.S. PATENT DOCUMENTS

| 4,304,872 | A | * | 12/1981 | Tenhagen | ............... 521/52 |
|---|---|---|---|---|---|
| 4,366,067 | A | | 12/1982 | Golding | |
| 5,104,548 | A | * | 4/1992 | Gabrick | ............... 210/680 |
| 5,180,704 | A | | 1/1993 | Reindl | |
| 5,181,802 | A | | 1/1993 | Thengs | |
| 5,281,463 | A | | 1/1994 | Cotton | |
| 5,364,680 | A | | 11/1994 | Cotton | |
| 5,507,127 | A | | 4/1996 | Gates | |
| 5,746,037 | A | * | 5/1998 | Nordberg | ............... 52/405.1 |
| 5,800,754 | A | * | 9/1998 | Woods | ............... 264/115 |
| 6,565,289 | B2 | * | 5/2003 | Khamis | ............... 405/286 |
| 7,094,338 | B2 | | 8/2006 | Morris | |
| 2002/0164213 | A1 | * | 11/2002 | Lewis | ............... 405/273 |
| 2005/0182160 | A1 | | 8/2005 | Milani Nejad | |

* cited by examiner

*Primary Examiner*—David J Bagnell
*Assistant Examiner*—Benjamin Fiorello
(74) *Attorney, Agent, or Firm*—David E Herron, II

(57) ABSTRACT

The disclosure shows an apparatus and a method for containing a spill of petroleum product. The inventive apparatus and method each include the assembly pliable building blocks of a generally rectangular shape that surrounds an internal void. The blocks form a wall by stacking successive horizontal rows of building blocks such that the respective internal voids vertically align, thereby forming adjacent columnar voids within the wall. The columnar voids are then filled with an adsorbent material that will cling to the petroleum product.

10 Claims, 4 Drawing Sheets

METHOD OF CONTAINING A SPILL

SUMMARY OF THE INVENTION

The invention includes a method and an apparatus for containing a spill, preferably of a petroleum product.

The Inventive Method

The inventive method includes the step of providing a plurality of pliable building blocks, each having a generally rectangular shape and an internal void. The method will also include the step of constructing a wall of building blocks by positioning a selected number of building blocks into a bottom row of building blocks that abut one another in a generally horizontal orientation. The method will further include the step of stacking successive horizontal rows of building blocks atop the bottom row, and positioning each successive row such that the respective internal voids vertically align to form adjacent columnar voids within the wall.

The method will also require one to fill the columnar voids with material that will adsorb the petroleum product. In a preferred embodiment of the method, the adsorbent material includes ground rubber. Additionally, beeswax (either shavings or in pellet-like form) has been found to be an effective adsorbent material.

In an alternate embodiment of the inventive method, each pliable block will include an ear formed at one lateral edge, and an indent formed along an opposite lateral edge. In this embodiment, each ear and indent are cooperatively formed so that the ear of a first block snugly fits within the indent of a second, adjacent block when adjacent blocks abut one another.

In a preferred embodiment of the inventive method, the internal void formed in the pliable blocks is divided into a left chamber and a right chamber by a barrier wall passing symmetrically therebetween. In this embodiment, each successive row of building blocks is positioned in a staggered fashion such that the left chamber of a lower block aligns with the right chamber of a block on a successive row.

In yet another preferred embodiment of the invention, the building blocks will bear at least one hole in order to receive a vertically-oriented rod that could be inserted into the wall by passing through the respective holes formed in each successive row of blocks.

The Inventive Apparatus

The invention is also an apparatus suitable for containing spills, such as spills of petroleum product. The inventive apparatus is includes a plurality of pliable building blocks, each having a generally rectangular shape and an internal void. The blocks are positioned to form successive horizontal rows.

In the inventive apparatus, the internal voids of each successive row of blocks align to columnar voids within the blocks. In a preferred design of the blocks, the internal void includes a left chamber and a right chamber symmetric to the left chamber about a barrier wall that passes therebetween. In this preferred design, the columnar voids may be formed by aligning the left chamber of a lower block with a right chamber of a block placed atop the lower one, which gives a staggered look to a wall composed of the blocks. In either design—staggered or not—these columnar voids will contain an adsorbent filling material.

Each pliable block may include an ear formed at one lateral edge, and an indent formed along an opposite lateral edge. In this embodiment, each ear and indent are cooperatively formed so that the ear of a first block fits within the indent of a second, adjacent block when adjacent blocks abut one another.

One or more holes (or apertures) may be formed in each building block so that a rod that may pass vertically through. The rod will help retain the apparatus in an assembled position.

The pliable building blocks are preferably made of a polyurethane product that can serve as an additional adsorbent for petroleum product; this will enhance the ability of the apparatus to contain an oil spill by supplementing the filler adsorbent material. Further, the pliable building blocks may also comprise a vermiculite.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
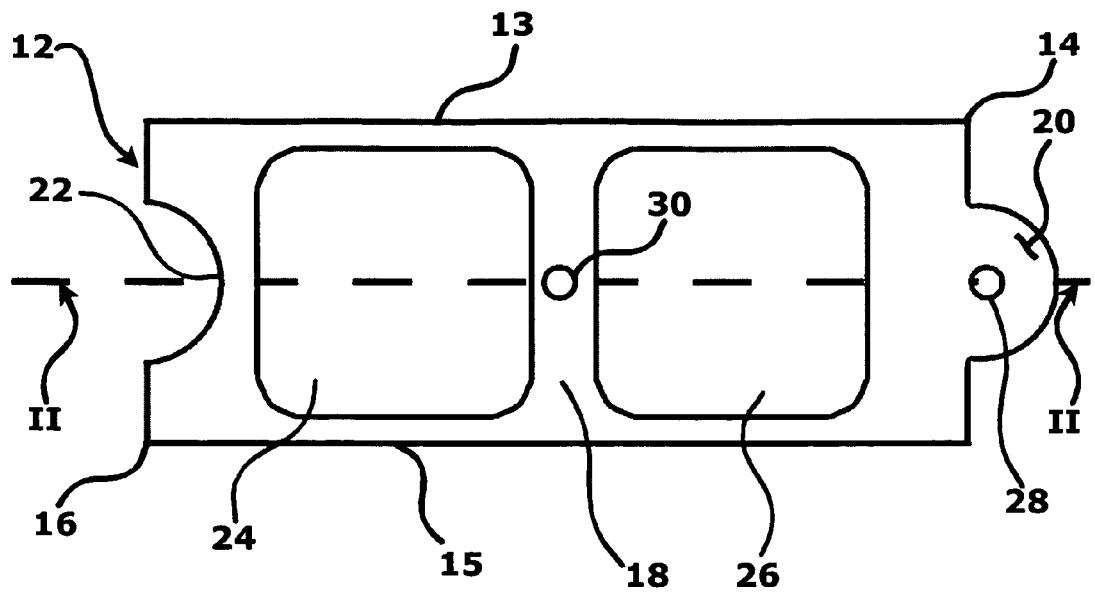
FIG. 1 is a plan view showing a building block, according to the principles of the invention.

FIG. 1 gives an isolated and plan view of a preferred design for a building block 12 that will be incorporated into the inventive apparatus and method. The building block 12 composed of a pliable material, such as a rubber or polyurethane. Experimentation has shown that a polyurethane and vermiculate mixture work well to carry out the aims of the invention.

Still referring to FIG. 1, the building block 12 bears a generally rectangular shape having a first lateral edge 14 and an opposite lateral edge 16. An ear 20 extends outwardly from the first lateral edge 14, while an indent 22 is formed on the opposite lateral edge 16. A barrier wall 18 divides an internal void into a left chamber 24 and a right chamber 26. As shown, the left chamber 24 is substantially symmetric to the right chamber 26 about the barrier wall 18. While the chambers 24,26 are shown to be rectangular or square, other configurations are certainly possible. Whatever the shape of the chambers 24, 26, however, symmetry about the retaining wall 18 is preferred.

As shown in FIG. 1, the ear 20 has a hole 28. Similarly, the barrier wall 18 bears an aperture 30. The ear 20 formed on the first lateral edge 14 should be cooperatively configured with the indent 22 on the opposite lateral edge 16 so that the ear 14 of one block will fit within the indent 22 of an adjacent building block (not shown in FIG. 1, but see FIG. 3).

Figure 2:
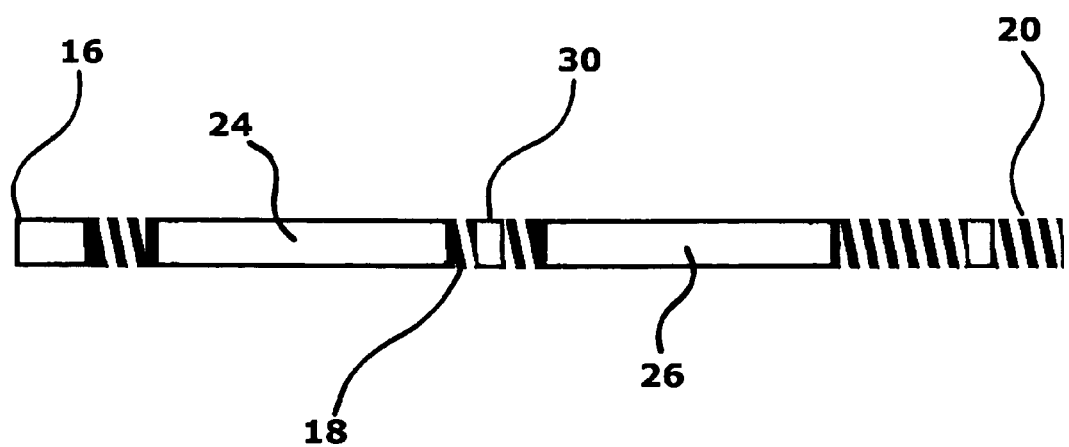
FIG. 2 is a cross-sectional side view of the building block, according to the principles of the invention.

FIG. 2 shows an isolated side view of a cross-section of the building block 12 of FIG. 1. The building block 12 has an internal void divided into a left chamber 24 from a right chamber 26 by a barrier wall 18 passing therebetween. When assembled into successive vertical rows of horizontally-adjacent building blocks, the chambers 24, 26 will align so that a columnar void (see aft) is formed by the inner walls of the respective chambers.

Figure 3:
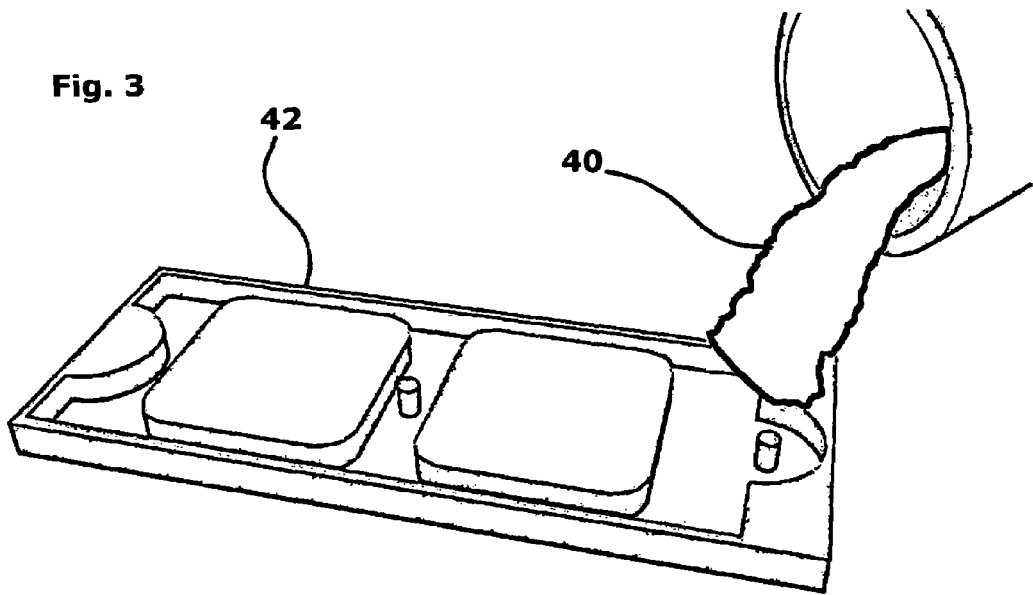
FIGS. 3 and 3A show perspective views that detail how the building blocks are made.
Figure 3A:
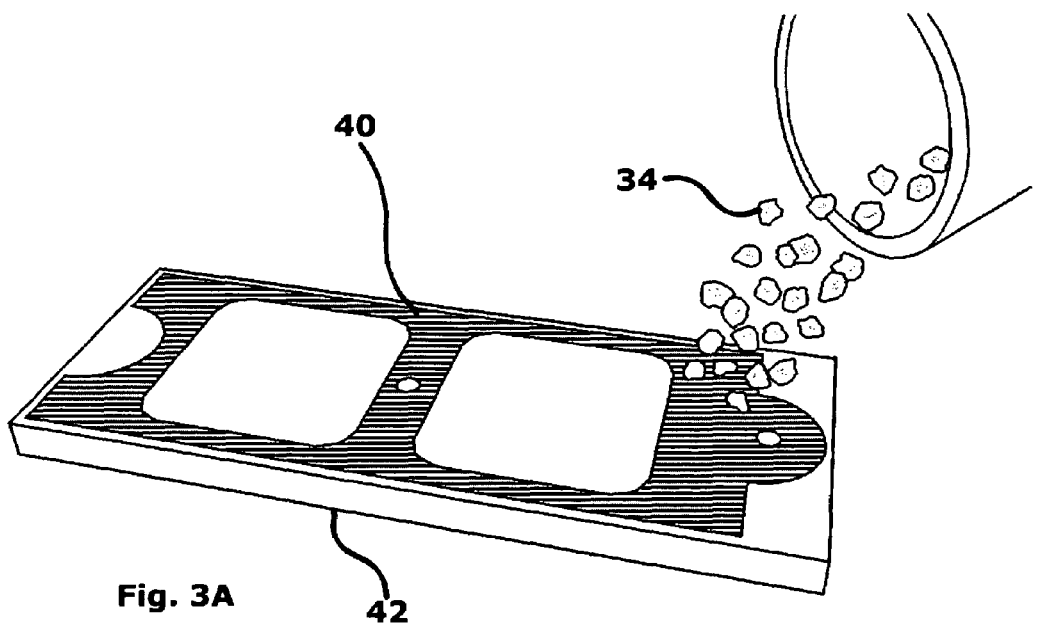

FIGS. 3 and 3A show a unique method of making the building block 12. As shown in FIG. 3, an adsorbent material 40 in gelatinous or liquid form, preferably a molten polyurethane, is poured into a mold 42 bearing the unique shape and form of the building block 12.

Referring now to FIG. 3A, as the material 40 begins to cure, a layer of ground rubber 34 is sprinkled across the top and onto the curing material 40. As the material cures, the ground rubber 34 adheres to the upper surface of the block and becomes integrally formed therein to form a contoured surface. This contoured surface will create small space to allow liquid (water and oil mix) to pass between layers of blocks (shown aft) when in the assembled position.

Figure 4:
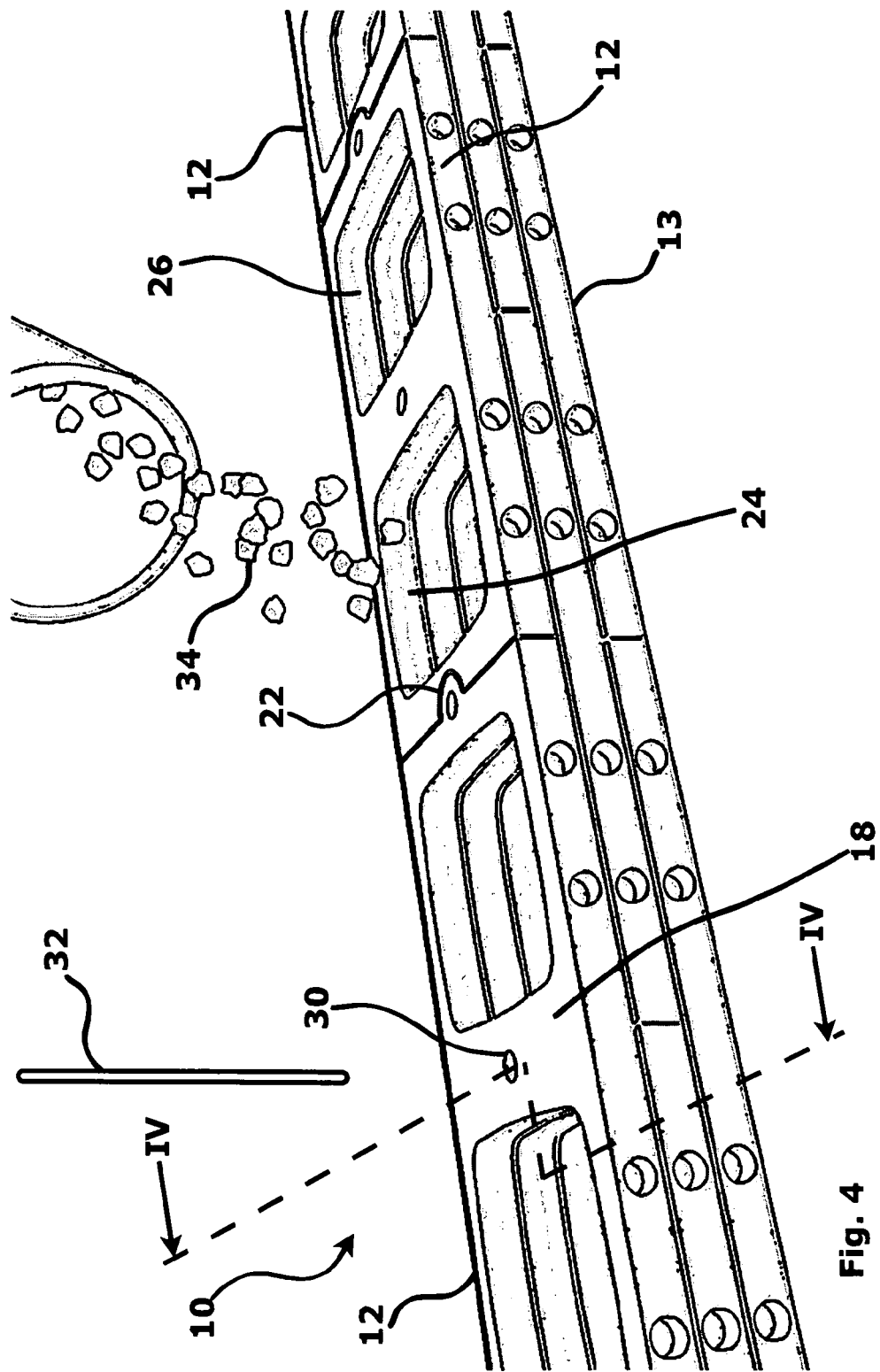
FIG. 4 shows a perspective view detailing how the building blocks are assembled together.

FIG. 4 gives a perspective view of the apparatus 10 that comprises a plurality of building blocks 12. The apparatus 10 will be formed by positioning a bottom row of blocks adjacent the ground, and successive rows of building blocks 12 atop the bottom row. As shown, an ear 28 of one building block 12 fits within the indent 22 of an adjacent one to form the apparatus 10 for containing spills, especially spills of petroleum product.

As shown in FIG. 4, the successive rows of building blocks 12 may be assembled together in a staggered fashion such that the left chamber 24 of a selected building block 12 aligns with the right chamber 26 of a building block 12' in an adjacent row. When the blocks are aligned in this manner, the chambers 24, 26 form a columnar void that extends generally vertically within an interior of the apparatus 10. An adsorbent material 34 is then put into each columnar void. While any known adsorbent may be inserted into the columnar voids, it is preferred to use ground rubber. Additionally, it has been found that beeswax added to ground rubber filler enhances the adsorbent quality.

Still referring to FIG. 4, the holes 28 and the apertures 30 are positioned and formed to enable the hole 28 of a building block 12 to align with the aperture 30 of a building block 12 on an adjacent row. Once respective holes and apertures are aligned, a rod 32 (or other type of connector) is fed through the apparatus 10 by passing it through the, thereby providing stability and support to the apparatus 10. Of course, while only one rod 32 is shown in FIG. 3, it is to be understood that a plurality of rods will enhance the stability of the apparatus.

Figure 5:
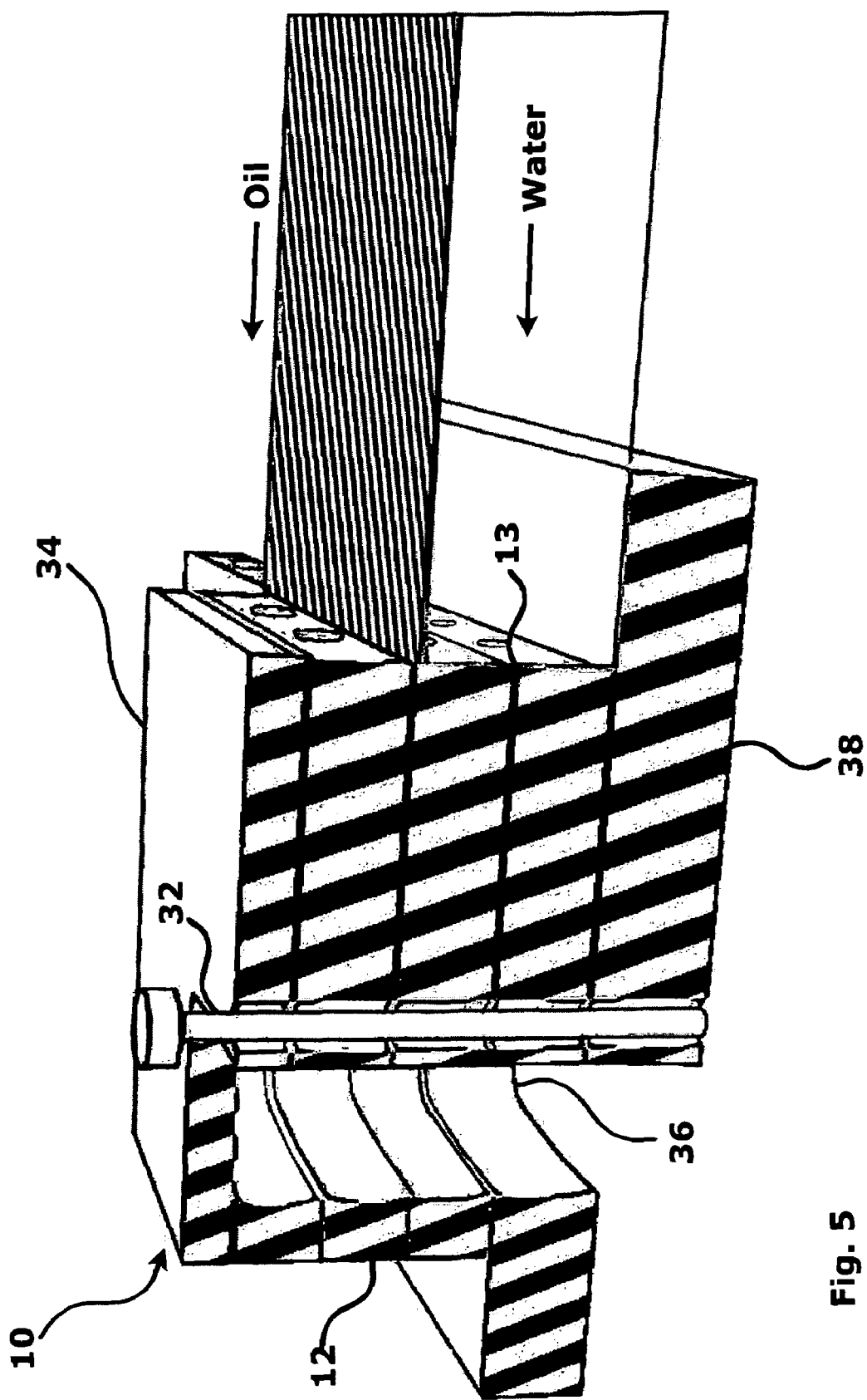
FIG. 5 shows a cross-sectional view of the embodiment shown in FIG. 4.

FIG. 5 shows a perspective view of the apparatus 10 that details a cross section taken at the plane IV-IV that is depicted in FIG. 3. As shown in FIG. 4, a columnar void 36 extends in a generally vertical direction from the footing 38 of the apparatus 10 and extending upwardly to the top of the apparatus 10. A top 34 covers the uppermost row of building blocks 12 in order to cover and contain filler 34 within each columnar void 36. In order to enhance the adsorbent quality of the apparatus 10, it is preferred that the top be made of an adsorbent material as well. A mixture or combination of polyurethane and vermiculate works well for the top. Preferably, the top 34 is held in place by the rod that is driven through the aligned holes and apertures (see, e.g., FIG. 3).

As shown in FIG. 5, the apparatus 10 may also include a footing 38 positioned beneath the lowest row of building blocks 12. Preferably, this footing 38 comprises a generally planar sheet of adsorbent material (such as a polyurethane and vermiculite combination) that can be embedded into the ground for enhanced stability. Preferably, when the apparatus 10 is in a fully-assembled position, the rod 32 will pass through the top 34, then through aligned apertures and holes formed on the building blocks, then through the footing 38 and into the ground.

As shown in FIG. 5, the apparatus 10 is constructed such that edges 13 of each building block 12 form a barrier that intercepts a spill, such as a spill containing a petroleum product and perhaps water mixed in with it. The spill will seep through cracks formed between the pliable blocks (note, there is preferably no mortar or connecting material between adjacent blocks). As set forth above, upper faces of the building blocks 12 are contoured, which creates cracks and small spaces between the pliable building blocks as successive rows are stacked onto one another.

The oleophilic qualities of the adsorbent filler material 34 will cause the petroleum product to adhere to the filler 34 positioned within the columnar voids 36, but the adsorbent material will allow non-petroleum product to pass through the apparatus 10 by seeping through the small spaces formed between the blocks 12.

Although the present invention has been described and illustrated in detail, it is to be clearly understood that the same is by way of illustration and example only, and is not to be taken by way of limitation. The spirit and scope of the present invention are to be limited only by claims that precisely define the metes and bounds of the invention.

I claim:

1. A method of containing a spill of petroleum product, the method including the steps of:
   providing a plurality of pliable building blocks, each building block having a generally rectangular shape and an internal void;
   constructing a wall of building blocks by
   positioning a selected number of building blocks into a bottom row of building blocks that abut one another in a generally horizontal orientation and, stacking successive horizontal rows of building blocks atop the bottom row; and, positioning each successive row such that the respective internal voids vertically align, thereby forming adjacent columnar voids within the wall;
   forming a hole in each block;
   inserting a vertically-oriented rod into the wall by passing it through the respective holes formed in each successive row of blocks,
   filling the columnar voids with material that will adsorb the petroleum product, the material including ground rubber.

2. The method as in claim 1, wherein the material further includes beeswax.

3. The method as in claim 1, each block comprising
   an ear extending from a lateral edge;
   an indent formed along an opposite lateral edge; wherein, each ear and indent are cooperatively formed so that the ear of a first block snugly fits within the indent of a second, adjacent block when adjacent blocks abut one another.

4. The method as in claim 3, further comprising the step of
   separating the internal void into a left chamber and a right chamber divided by a barrier wall passing symmetrically therebetween; and wherein,
   the step of positioning each successive row of building blocks includes the step of staggering the blocks so that the left chamber of a lower block aligns with the right chamber of a block on a successive row.

5. The method as in claim 1,
   wherein the pliable block comprises at least one face that is contoured.

6. The method as in claim 1, further comprising the step of forming a pair of symmetrically formed chambers divided by a barrier wall within the internal void.

7. A method of containing a spill of petroleum product, the method including the steps of:
   providing a plurality of pliable building blocks, each building block having a generally rectangular shape and an internal void having a left chamber and a right chamber divided by a barrier wall passing symmetrically therebetween;

extending an ear from a lateral edge of each block, and forming an indent along an opposite lateral edge of each block; and, cooperatively forming the ear and indent so that the ear of a first block fits within the indent of a second, adjacent block when adjacent blocks abut one another;

forming a hole adjacent the ear of each block;

forming an aperture on the barrier wall;

constructing a wall of building blocks by positioning a selected number of building blocks into a bottom row of building blocks that abut one another in a generally horizontal orientation and, stacking successive horizontal rows of building blocks atop the bottom row; and, positioning each successive row such that the left chamber of a lower block vertically aligns with the right chamber of a block on a successive horizontal row, thereby forming adjacent columnar voids within the wall;

filling the columnar voids with a filler material comprising ground rubber and beeswax; and, inserting at least one rod into the wall by passing it through holes and apertures.

8. The method as in claim 7, wherein the pliable building blocks comprise polyurethane.

9. The method as in claim 8, wherein the pliable building blocks further include vermiculite.

10. The method as in claim 7, wherein the step of providing pliable building blocks comprises the steps of:

providing a mold;

pouring a polyurethane into the mold;

and, after allowing the polyurethane to at least partly cure, covering at least a portion of the partly-cured polyurethane with a film of ground rubber.

* * * * *